US009991744B2

(12) United States Patent
Lee et al.

(10) Patent No.: US 9,991,744 B2
(45) Date of Patent: Jun. 5, 2018

(54) WIRELESS POWER RECEIVING DEVICE AND APPARATUS INCLUDING THE SAME

(71) Applicant: SAMSUNG ELECTRO-MECHANICS CO., LTD., Suwon-si (KR)

(72) Inventors: Sang Jong Lee, Suwon-si (KR); Han Kim, Suwon-si (KR); Tae Ho Yun, Suwon-si (KR); Kang Heon Hur, Suwon-si (KR); Su Bong Jang, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 190 days.

(21) Appl. No.: 15/196,426

(22) Filed: Jun. 29, 2016

(65) Prior Publication Data

US 2017/0005519 A1 Jan. 5, 2017

(30) Foreign Application Priority Data

Jul. 3, 2015 (KR) .................. 10-2015-0095485
Jul. 10, 2015 (KR) .................. 10-2015-0098292
Mar. 11, 2016 (KR) .................. 10-2016-0029796

(51) Int. Cl.
*H02J 7/00* (2006.01)
*H02J 50/10* (2016.01)
*H02J 50/80* (2016.01)
*H02J 7/02* (2016.01)
(Continued)

(52) U.S. Cl.
CPC .............. *H02J 50/10* (2016.02); *H02J 7/025* (2013.01); *H02J 50/80* (2016.02); *H04B 5/0037* (2013.01); *H02J 50/90* (2016.02)

(58) Field of Classification Search
CPC . H02J 50/10; H02J 50/80; H02J 50/90; H04B 5/0081; H04B 5/0087; H04B 5/0093
See application file for complete search history.

(56) References Cited

U.S. PATENT DOCUMENTS 9,553,476 B2* 1/2017 An .......................... H01Q 1/22
2001/0011012 A1* 8/2001 Hino ....................... H01Q 1/22
455/575.7

(Continued)

FOREIGN PATENT DOCUMENTS

JP 11-40438 A 2/1999
JP 2003-109830 A 4/2003
(Continued)

OTHER PUBLICATIONS

Korean Office Action issued in counterpart Korean Application No. 10-2016-0029796 dated Jan. 26, 2017 (7 pages in English, 5 pages in Korean).

*Primary Examiner* — Jeffrey Shin
(74) *Attorney, Agent, or Firm* — NSIP Law

(57) ABSTRACT

A wireless power receiving device includes a first coil partially disposed in an outer region and configured to transmit and/or receive data; and a second coil disposed inwardly of an inner boundary line of the outer region and configured to receive wirelessly transmitted power, wherein a center defined by an inner boundary line and a center defined by an outer boundary line of the second coil are different from each other.

20 Claims, 9 Drawing Sheets

(51) Int. Cl.
 *H04B 5/00* (2006.01)
 *H02J 50/90* (2016.01)

(56) References Cited

U.S. PATENT DOCUMENTS

| | | | |
|---|---|---|---|
| 2009/0108974 A1* | 4/2009 | Raggam | G06K 19/07749 |
| | | | 336/105 |
| 2012/0169279 A1 | 7/2012 | Kim | |
| 2015/0145635 A1* | 5/2015 | Kurz | H01F 38/14 |
| | | | 336/232 |
| 2015/0381239 A1* | 12/2015 | Shostak | H04B 5/0037 |
| | | | 455/41.1 |

FOREIGN PATENT DOCUMENTS

| | | |
|---|---|---|
| JP | 2004-47849 A | 2/2004 |
| KR | 10-2011-0029358 A | 3/2011 |
| KR | 10-2014-0129897 A | 11/2014 |

\* cited by examiner

WIRELESS POWER RECEIVING DEVICE AND APPARATUS INCLUDING THE SAME

CROSS-REFERENCE TO RELATED APPLICATION(S)

This application claims the benefit under 35 USC 119(a) of Korean Patent Application Nos. 10-2015-0095485 filed on Jul. 3, 2015, 10-2015-0098292 filed on Jul. 10, 2015 and 10-2016-0029796 filed on Mar. 11, 2016 in the Korean Intellectual Property Office, the entire disclosures of which are incorporated herein by reference for all purposes.

BACKGROUND

1. Field

The following description relates to a wireless power receiving device receiving wirelessly transmitted power, and an apparatus including the same.

2. Description of Related Art

Wireless power transfer technology has been widely applied to the chargers of various communications apparatuses including smartphones and several types of home appliances, and may also be applied to an electric vehicle in the future. As described above, wireless power transfer technology is utilized in a wide range of fields. Various attempts to increase charging efficiency, extend a lifespan of a device, and improve the performance of a circuit have been conducted in the wireless power transfer field.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect, a wireless power receiving device includes a first coil partially disposed in an outer region and configured to transmit and/or receive data; and a second coil disposed inwardly of an inner boundary line of the outer region and configured to receive wirelessly transmitted power, wherein a center defined by an inner boundary line and a center defined by an outer boundary line of the second coil are different from each other.

The distance between the center defined by the inner boundary line and the center defined by the outer boundary line of the second coil may be equal to about 7% or more of a distance between the center defined by the inner boundary line and the inner boundary line of the second coil in a direction of a virtual line connecting the center defined by the inner boundary line and the center defined by the outer boundary line of the second coil to each other.

The distance between the center defined by the inner boundary line of the second coil and the center defined by the outer boundary line of the second coil may be about 15% or less of the distance between the center defined by the inner boundary line of the second coil and the inner boundary line of the second coil in the direction of the virtual line connecting the center of the inner boundary line of the second coil and the center of the outer boundary line of the second coil to each other.

The second coil may include a first region and a second region, the second region being separate from the first region, and an average value of pattern widths in the first region being larger than that of pattern widths in the second region.

A distance between the center of the inner boundary line of the second coil and an inner boundary line of the first coil in the first region may be larger than a distance between the center of the inner boundary line of the second coil and the inner boundary line of the first coil in the second region.

The average value of the widths of the patterns in the first region may be about 1.1 times or more the average value of the widths of the patterns in the second region.

The average value of the widths of the patterns in the first region may be equal to about 1.25 times or less the average value of the widths of the patterns in the second region.

The first region may include a region in which a lead-in wire connecting an internal terminal of the second coil to a terminal disposed outside of the second coil is disposed.

The second coil may be formed of n layers, where n is a natural number, in the first region, and is formed of m layers, where m is a natural number which is larger than n, in the second region.

A shape formed by the inner boundary line of the second coil and a shape formed by the outer boundary line of the second coil may be different from each other.

According to another general aspect, an apparatus includes a processor configured to input or output data; a battery configured to supply power to the processor; and a wireless power receiving device configured to receive wirelessly transmitted power and selectively supply charging power to the battery and the processor, wherein the wireless power receiving device includes a first coil partially disposed in an outer region and configured to transmit and/or receive the data; and a second coil disposed inwardly of an inner boundary line of the outer region and configured to receive the wirelessly transmitted power, a center defined by an inner boundary line and a center defined by an outer boundary line of the second coil being different from each other.

A distance between the center defined by the inner boundary line of the second coil and the center defined by the outer boundary line of the second coil may be equal to about 7% or more of a distance between the center defined by the inner boundary line of the second coil and the inner boundary line defined by the second coil in a direction of a virtual line connecting the center of the inner boundary line of the second coil and the center of the outer boundary line of the second coil to each other.

The second coil may include a first region and a second region, the second region being separate from the first region, and an average value of pattern widths in the first region is larger than that of pattern widths in the second region.

The average value of the widths of the patterns in the first region may be about 1.1 times or more the average value of the widths of the patterns in the second region.

The first region may include a region in which a lead-in wire connecting an internal terminal of the second coil to a terminal disposed outside of the second coil is disposed.

The second coil may be formed of n layers, where n is a natural number, in the first region, and is formed of m layers, where m is a natural number which is larger than n, in the second region.

According to another general aspect, a wireless device, includes a coil loop conductor having a first width at a first circumferential portion, and a second width at a second circumferential portion, wherein the first width is different from the second width; a central portion asymmetrically disposed within the coil loop conductor; and, a lead out conductor portion extending from the central portion to an outer portion.

The wireless device may further include a first communication coil disposed in substantially concentric manner with the coil loop conductor, and wherein the coil loop conductor is a wireless power coil configured to receive or transmit wireless power.

The wireless device may further include a second communication coil disposed proximate the first communication coil and wireless power coil.

The second communication coil may include two connected lobes, the two connected lobes collectively surrounding both the first communication coil and the wireless power coil.

A center, defined relative to an inner periphery of the coil loop conductor, may be displaced from a center defined relative to an outer periphery of the coil loop conductor.

A center, defined relative to a first outer peripheral portion, may be displaced from a center defined relative to a second outer peripheral portion.

The first circumferential portion and second circumferential portions may be substantially linear, separate, peripheral portions.

According to another general aspect, a wireless device, includes a loop conductor extending in a spiral manner from an external terminal to an internally defined central portion, the central portion being asymmetrically disposed with respect to an outer periphery of the loop conductor, and the loop conductor undulating between different widths as it traverses the spiral; and, a lead out portion connecting a distal end of the loop conductor to the external terminal.

The loop conductor may include a plurality of layers m, interconnected with vias, and a plurality of layers n, where n is less than m, proximate the lead out portion.

The loop conductor may be a wireless power coil and the wireless device may further include a first and second communications coil.

The loop conductor may undulate between a first width and a second width, the undulations to a second width occurring at corresponding circumferential portions at each loop along the spiral, where the second width is at least about 1.1 times the first width.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
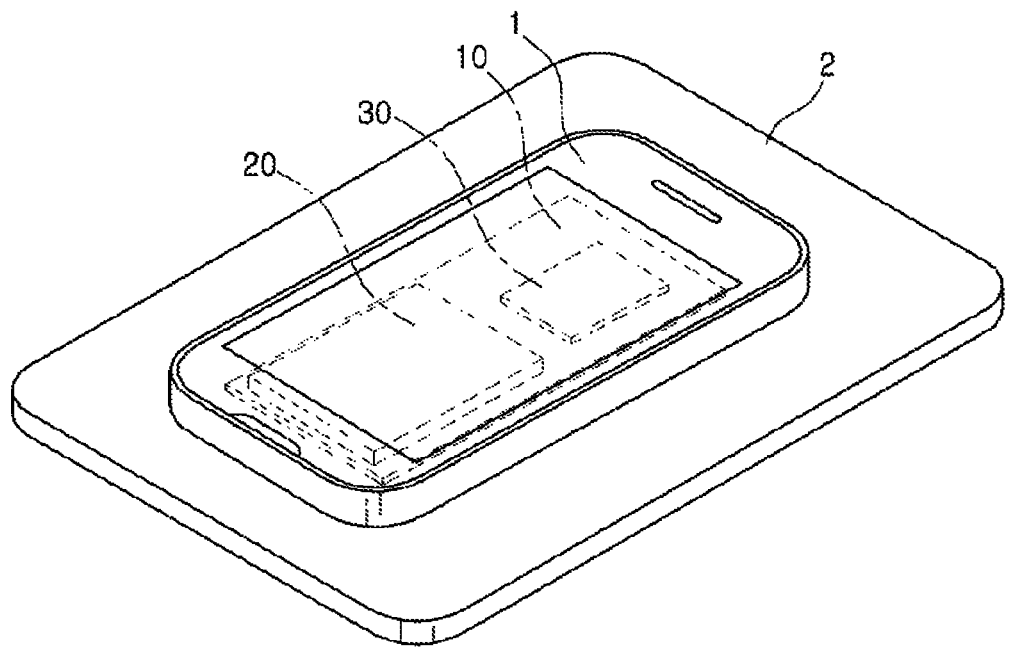
FIGS. 1 and 2 are schematic perspective views illustrating a wireless power charging system including an apparatus including a wireless power receiving device, according to an embodiment, and a wireless power transmitting device.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there are no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" than the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the following description. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments will be described with reference to schematic views. In the drawings, for example, due to manufacturing techniques and/or tolerances, modifications of the shape shown may be estimated. Thus, embodiments should not be construed as being limited to the particular shapes of regions shown herein, but should be understood to include, for example, a change in shape resulting from manufacturing. The following embodiments may also be constituted by one or a combination thereof.

A wireless power receiving device and an apparatus including the same, according to an embodiment, will now be described with reference to the accompanying drawings.

FIG. 1 is a schematic perspective view illustrating a wireless power charging system including an apparatus having a wireless power receiving device, according to an embodiment, and a wireless power transmitting device. The wireless power charging system, according to an embodiment, includes an apparatus 1 including a wireless power receiving device 10 and a wireless power transmitting device 2. The apparatus, according to an embodiment, includes the wireless power receiving device 10, a battery 20, and a processor 30.

The wireless power transmitting device 2 wirelessly transmits power. Although only generally illustrated, the wireless power transmitting device 2 may include an inverter circuit generating alternating current (AC) power and a transmission coil receiving the AC power applied thereto and wirelessly transmitting the power.

The wireless power receiving device 10 receives the power wireless transmitted by the wireless power transmitting device 2 and outputs charging power. In addition, the wireless power receiving device 10 may transmit and/or receive data. Although only generally illustrated, the wireless power receiving device 10 includes a reception coil receiving the wirelessly transmitted power, a rectifying circuit connected to the reception coil and configured to rectify the AC power output from the reception coil. In addition, the wireless power receiving device 10 may include a communications coil for transmitting and/or receiving the data.

In some embodiments, the wireless power receiving device 10 may be a device that may be separated from the apparatus 1. For example, the wireless power receiving device 10 may be a substrate, such as an adhesive sticker, a battery, a casing, or a rear-battery cover, on which the reception coil is formed. The communications coil for transmitting and/or receiving the data may be additionally formed on the substrate. In addition, the rectifying circuit may be disposed on the substrate. Alternatively, all or some components of the wireless power receiving device 10 may be implemented to be coupled to a case or a body of the apparatus 1. For example, the reception coil and the communications coil of the wireless power receiving device 10 may be implemented to be coupled to the case of the apparatus 1. In this example, the case of the apparatus 1 may be the wireless power receiving device. Alternatively, the wireless power receiving device 10 may include the reception coil and the communications coil, and the rectifying circuit may be disposed on a substrate of a body of the apparatus 1.

The battery 20 stores energy therein using the charging power output by the wireless power receiving device 10.

The processor 30 inputs and outputs the data. The processor 30 may be disposed on a printed circuit board on which various elements are mounted. The processor 30 receives power supplied by the battery 20 or receives power directly supplied by the wireless power receiving device 10.

The apparatus 1 performs various operations using the energy stored in the battery 20. For example, the apparatus 1 may include a display device receiving power supplied by the battery 20 to display various kinds of information, and may include a communications module, a microphone, and a speaker receiving power supplied by the battery 20 to perform a mobile communications function. Alternatively, the communications module may also be included in the processor 30.

Figure 2:
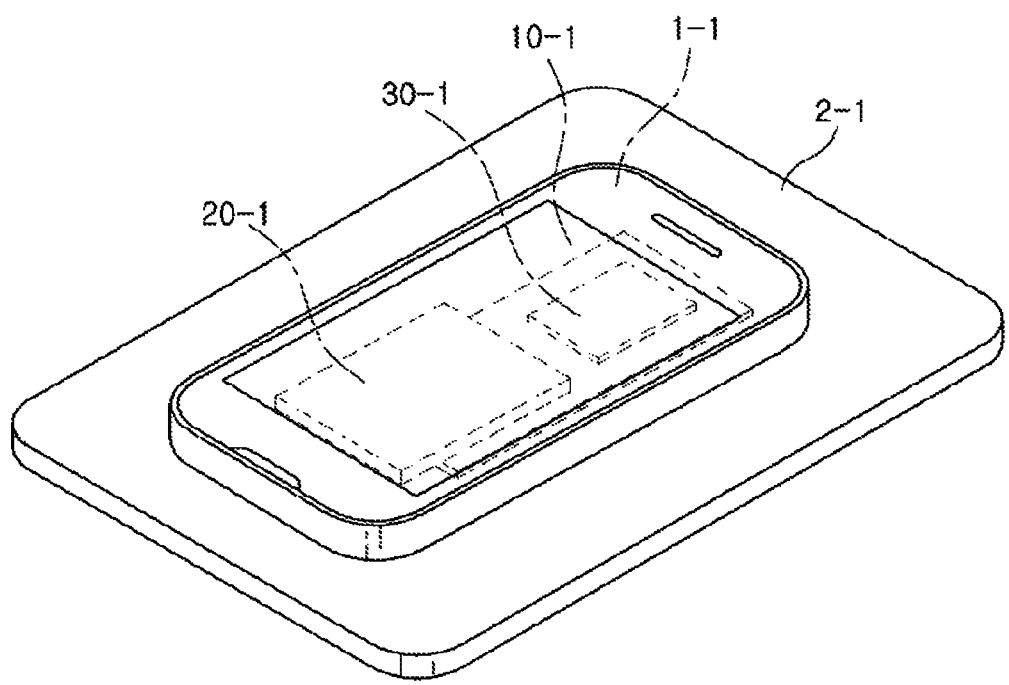

FIG. 2 is a schematic perspective view illustrating a wireless power charging system including an apparatus including a wireless power receiving device, according to an embodiment, and a wireless power transmitting device. The wireless power charging system, according to an embodiment, includes an apparatus 1-1 including a wireless power receiving device 10-1 and a wireless power transmitting device 2-1. The apparatus, according to an embodiment, includes the wireless power receiving device 10-1, a battery 20-1, and a processor 30-1.

Functions and operations of the apparatus 1-1, the wireless power receiving device 10-1, the battery 20-1, the processor 30-1, and the wireless power transmitting device 2-1 are substantially the same as those of the apparatus 1, the wireless power receiving device 10, the battery 20, the processor 30, and the wireless power transmitting device 2 respectively described above with reference to FIG. 1.

As illustrated in FIG. 2, in many cases, a position of the wireless power receiving device 10-1 is not a central portion of the apparatus 1-1, but may be biased toward any one side of the apparatus 1-1. For example, because the processor 30-1, other input/output elements or devices, etc., occupy a predetermined region of the apparatus, the wireless power receiving device 10-1 may be disposed to be biased toward any one side of the apparatus 1-1.

An example in which the apparatus including a wireless power receiving device is a smart phone has been illustrated in FIGS. 1 and 2, but the wireless power receiving device, according to an embodiment, may be used in various apparatuses such as an electric vehicle, tablet, laptop, wearable device, as well as a mobile apparatus.

Figure 3:
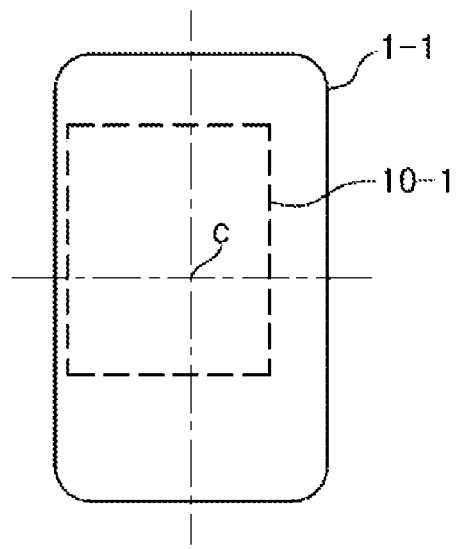
FIG. 3 is a schematic rear view illustrating the apparatus including a wireless power receiving device, according to an embodiment illustrated in FIG. 2.

FIG. 3 is a schematic rear view illustrating the apparatus including a wireless power receiving device, according to an embodiment, illustrated in FIG. 2. In FIG. 3, an intersection point between alternating long and short dashed lines refers to a center (hereinafter, referred to as an apparatus center) c of the apparatus.

For the purpose of efficient wireless power transmission, a center (hereinafter, referred to as a reception coil center) of a reception coil of the wireless power receiving device 10-1 and a center (hereinafter, referred to as a transmission coil center) of a transmission coil of the wireless power transmitting device 2-1 (see FIG. 2) should be aligned with each other. To this end, the apparatus 1-1 should be very precisely positioned in a predetermined position (for example, a center) of the wireless power transmitting device 2-1 (see FIG. 2). In this case, the apparatus center may be aligned with the transmission coil center. Therefore, for the purpose of efficient wireless power transmission, the reception coil center should be designed to be aligned with the apparatus center c.

As illustrated in FIG. 3, due to a configuration of the apparatus 1-1 or a layout of other components, the wireless power receiving device 10-1 is not positioned at a central portion of the apparatus 1-1, but is generally biased toward any one side of the apparatus 1-1. In this case, when the wireless power receiving device is designed so that the reception coil center is aligned with the apparatus center c, the reception coil center is also not positioned in the center of the wireless power receiving device 10-1, but is biased toward any one side of the wireless power receiving device 10-1.

Figure 4:
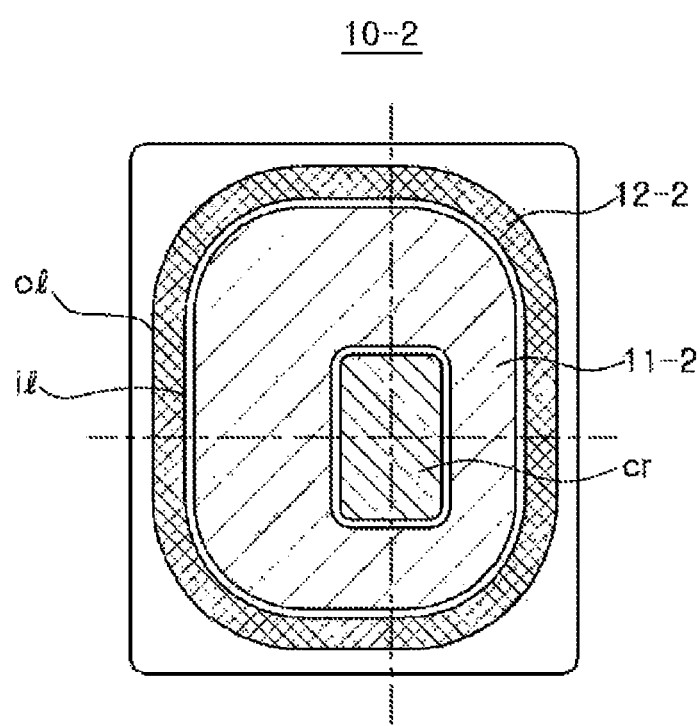
FIG. 4 through 12 are, respectively, schematic plan views illustrating a wireless power receiving device, according to one or more embodiments.

FIG. 4 is a schematic plan view illustrating a wireless power receiving device, according to an embodiment. In FIG. 4, reference numeral 11-2 refers to a region in which patterns of a reception coil are formed. In addition, in FIG. 4, an intersection point between alternating long and short dashed lines refers to a center of an apparatus including the wireless power receiving device. Further, in FIG. 4, reference numeral 12-2 refers to a region in which patterns of a communications coil are formed. That is, as illustrated in FIG. 4, the wireless power receiving device, according to an embodiment, includes a plurality of coils performing different functions.

As illustrated in FIG. 4, where the reception coil has a spiral shape, a region in which the patterns of the reception coil are formed in the wireless power receiving device 10-2 is a region excluding a region cr corresponding to a central portion of an apparatus in the wireless power receiving device 10-2.

In addition, in an example where the wireless power receiving device 10-2 further includes another coil, for example, a communications coil such as a near field communications (NFC) coil for near field communications or a magnetic security transmission (MST) coil generating a magnetic field to transmit information (for example, credit card information), in addition to the reception coil, the region 11-2 in which the patterns of the reception coil are formed is a region excluding the region cr corresponding to the central portion of the apparatus and a region 12-2 in which patterns of the communications coil are formed in the wireless power receiving device 10-2, that is, an intermediate region between the region cr corresponding to the central portion of the apparatus and a region 12-2 of the wireless power receiving device 10-2 in which the communications coil, is disposed in the wireless power receiving device 10-2. The region 12-2 in which the communications coil is formed is an outer region of the wireless power receiving device 10-2. As illustrated in FIG. 4, the outer region has a doughnut or toroidal shape. That is, the outer region, a region close to an edge of the wireless power receiving device having a substrate form or a case form of the apparatus, is a region between an outer boundary line ol and an inner boundary line il. The region 11-2 in which the reception coil is formed is positioned in the inner boundary line il of the region 12-2 in which the communications coil is formed, and has a doughnut shape.

Widths of the patterns of the reception coil have different values depending on regions. That is, in FIG. 4, at least one of an average value of pattern widths formed in an upper region of the region 11-2 in which the reception coil is disposed, an average value of pattern widths formed in a lower region of the region 11-2 in which the reception coil is disposed, an average value of pattern widths formed in a left region of the region 11-2 in which the reception coil is disposed, and an average value of pattern widths formed in a right region of the region 11-2 in which the reception coil is disposed are different from the others of the average values. For example, all of the four values described above are different from each other, any one of the four values described above is different from the other three values, or any two of the four values described above may be different from the other two values.

Therefore, the reception coil 11-2 of the wireless power receiving device 10-2, according to an embodiment, has an asymmetrical shape as illustrated in FIG. 4, and is disposed so that widths of margin spaces in four directions in the region in which the reception coil 11-2 is disposed in the wireless power receiving device (that is, distances from an outer boundary line of the reception coil 11-2 to an end portion of the wireless power receiving device 10-2 or an inner boundary line of the communications coil (not illustrated)) are the same as each other. That is, the reception coil 11-2 of the wireless power receiving device 10-2, according to an embodiment, is disposed so that the region in which the reception coil is disposed is efficiently utilized.

Figure 5:
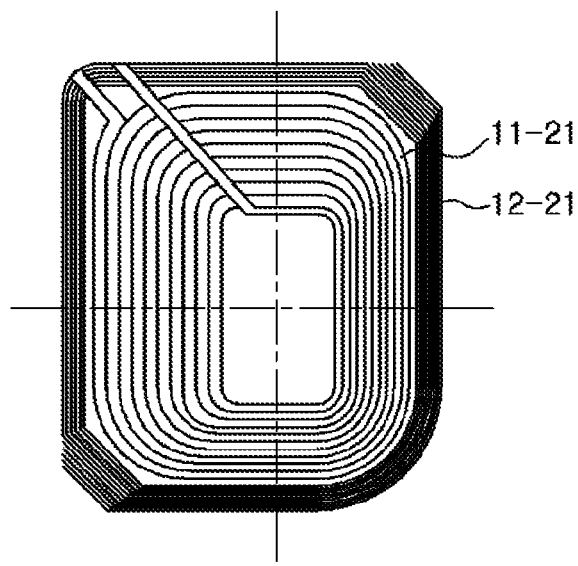

FIG. 5, a schematic plan view illustrating the wireless power receiving device, according to an embodiment. Coils of the wireless power receiving device are shown, according to an embodiment illustrated in FIG. 4, in more detail. In FIG. 5, an intersection point between alternating long and short dashed lines refers to a center of an apparatus including the wireless power receiving device.

As illustrated in FIG. 5, the wireless power receiving device 10-21, according to an embodiment, includes a reception coil 11-21 and a communications coil 12-21. The reception coil 11-21 is disposed in the region corresponding to region 11-2 of FIG. 4, and the communications coil 12-21 is disposed in the region corresponding to region 12-2 of FIG. 4.

Patterns of the reception coil 11-21 are formed in a region excluding a region corresponding to a central portion of the apparatus and a region in which the communications coil 12-21 is disposed in the wireless power receiving device 10-21. As illustrated in FIG. 5, a position corresponding to a center of the apparatus in the wireless power receiving device 10-21 is biased toward a lower portion of the right of the center of the wireless power receiving device 10-21. In this case, each of an average value of pattern widths in an upper region of the reception coil 11-21 and an average value of pattern widths in a left region of the reception coil 11-21 are larger than that of pattern widths in a lower region of the reception coil 11-21 or that of pattern widths in a right region of the reception coil 11-21.

Therefore, in the wireless power receiving device 10-21, according to an embodiment, patterns are formed to be relatively wide in at least some regions of the reception coil 11-21, such that resistance in the patterns is reduced and copper loss, a cause of heat generation, is also reduced. As a result, heat generation is reduced. Further, an interval between the reception coil 11-21 and the communications coil 12-21 is reduced, such that heat radiation performance is also improved.

Figure 6:
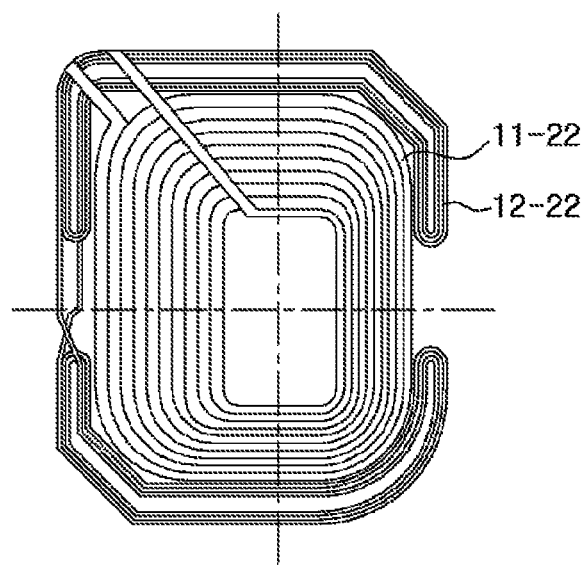

FIG. 6, a schematic plan view illustrating the wireless power receiving device, according to an embodiment, is a view illustrating coils of the wireless power receiving device, according to an embodiment illustrated in FIG. 4, in more detail. In FIG. 6, an intersection point between alternating long and short dashed lines refers to a center of an apparatus including the wireless power receiving device.

As illustrated in FIG. 6, the wireless power receiving device 10-22, according to an embodiment, includes a reception coil 11-22 and a communications coil 12-22. The reception coil 11-22 is disposed in a region corresponding to the region 11-2 of FIG. 4, and the communications coil 12-22 is disposed in a region corresponding with the region 12-2 of FIG. 4.

The wireless power receiving device, according to an embodiment illustrated in FIG. 6, is substantially the same as the wireless power receiving device illustrated in FIG. 5 except that the communications coil 12-22 includes a coil portion disposed at one side of the reception coil 11-22 and a coil portion disposed at the other side of the reception coil 11-22 facing one side of the reception coil 11-22. That is, the communications coil 12-22 of the wireless power receiving device, according to an embodiment, is divided into a plurality of coil portions disposed in substantially separated manner surrounding the reception coil 11-22.

An example in which the wireless power receiving device, according to an embodiment, includes both of one reception coil and one communications coil has been illustrated in FIGS. 5 and 6, but the wireless power receiving device, according to an embodiment, may include only the reception coil or include two or more communications coils.

Figure 7:
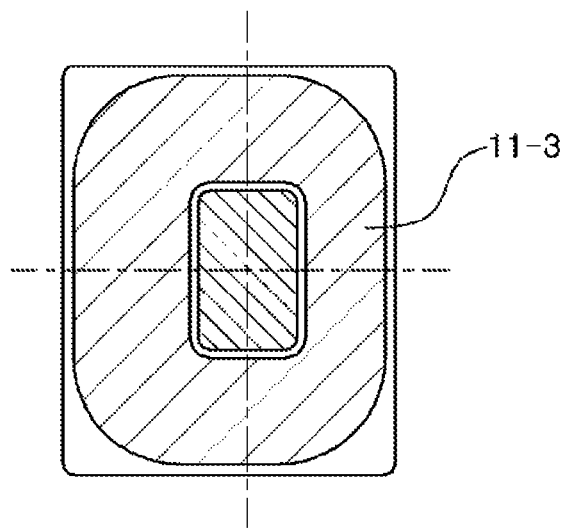

FIG. 7 is a schematic plan view illustrating a wireless power receiving device, according to an embodiment. In FIG. 7, an intersection point between alternating long and short dashed lines refers to a center of an apparatus including the wireless power receiving device.

As illustrated in FIG. 7, in the wireless power receiving device 10-3, according to an embodiment, a region 11-3 in which patterns of a reception coil are formed is biased toward the one lateral side, such as the left side of the wireless power receiving device 10-3, however, the patterns of the reception coil may also be biased to the right of the wireless power receiving device 10-3. For example, when the wireless power receiving device 10-3 is disposed to be biased toward the left of an apparatus including the wireless power receiving device 10-3, a region 11-3 in which patterns of the reception coil are formed is biased toward the right of the wireless power receiving device 10-3 in order for a center of the reception coil (a center of an inner boundary line of the reception coil) to be positioned in a position corresponding to a center of the apparatus. In this case, an average value of pattern widths in a left region of the reception coil is larger than those of pattern widths in other regions.

Figure 8:
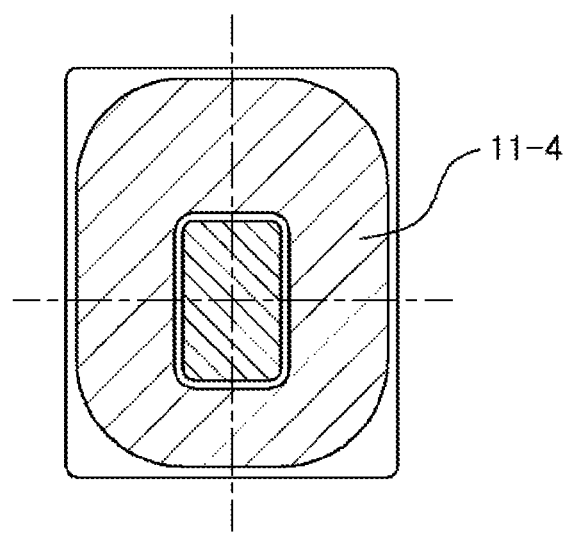

FIG. 8 is a schematic plan view illustrating a wireless power receiving device, according to an embodiment. In FIG. 8, an intersection point between alternating long and short dashed lines refers to a center of an apparatus including the wireless power receiving device.

As illustrated in FIG. 8, in the wireless power receiving device 10-4, according to an embodiment, a region 11-4 in which patterns of a reception coil are formed is biased toward a lower side of the wireless power receiving device 10-4. For example, where the wireless power receiving device 10-4 is disposed to be biased toward an upper side of an apparatus including the wireless power receiving device 10-4, a region 11-4 in which patterns of the reception coil are formed is biased, in compensatory manner, toward the lower side of the wireless power receiving device 10-4 in order for a center of the reception coil (a center of an inner boundary line of the reception coil) to be positioned in a location corresponding to a center of the apparatus. In this case, an average value of pattern widths in an upper region of the reception coil may be larger than those of pattern widths in other regions.

Figure 9:
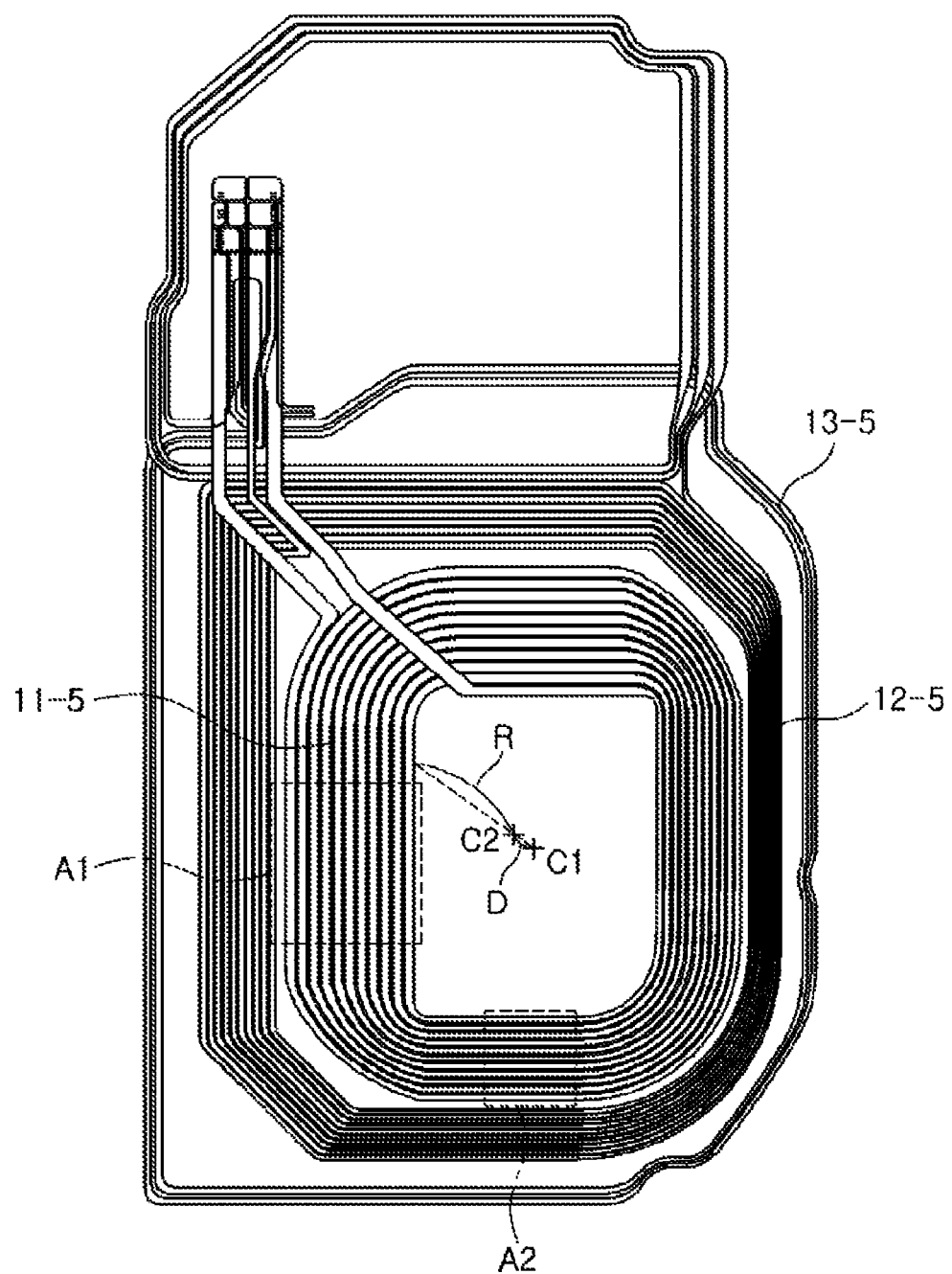

FIG. 9, a schematic plan view illustrating a wireless power receiving device, according to an embodiment. As illustrated in FIG. 9, the wireless power receiving device 10-5, according to an embodiment, includes a reception coil 11-5, a first communications coil 12-5, and a second communications coil 13-5.

The first communications coil 12-5 and the second communications coil 13-5 are disposed at an outer region of the wireless power receiving device 10-5. The reception coil 11-5 is disposed inwardly of an inner boundary line of the outer region in which the first communications coil 12-5 and the second communications coil 13-5 are disposed.

The entirety of the first communications coil 12-5 and the second communications coil 13-5 are disposed in the outer region of the wireless power receiving device 10-5 has been illustrated in FIG. 9, but a portion of the first communications coil 12-5 or the second communications coil 13-5 may, in other embodiments, also be disposed inwardly of an inner boundary line of a region in which the reception coil 11-5 is formed. For example, the first communications coil 12-5 or the second communications coil 13-5 are configured by connecting two coil portions to each other. Here, one coil portion is disposed in the outer region of the wireless power receiving device 11-5 and the other coil portion is disposed inside the inner boundary line of the region in which the reception coil 11-5 is formed.

The reception coil 11-5 receives and/or transmits wirelessly transmitted power.

The first communications coil 12-5 and the second communications coil 13-5 transmit and/or receive data in different schemes. For example, the first communications coil 12-5 is an MST coil transmitting information (for example, credit card information) using a magnetic field, and the second communications coil 13-5 is an NFC coil for near field communications.

Coil patterns of the second communications coil 13-5 are formed in an outer region of the wireless power receiving device 10-5. Coil patterns of the first communications coil 12-5 are formed inwardly of an inner boundary line of the second communications coil 13-5. Coil patterns of the reception coil 11-5 are formed inwardly of an inner boundary line of the first communications coil 12-5.

In FIG. 9, C1 refers to a center of an inner boundary line of the reception coil 11-5, and C2 refers to a center of an outer boundary line of the reception coil 11-5. In an embodiment, C1 corresponds to a center of an apparatus including the wireless power receiving device 10-5. In addition, C1 corresponds to a center of a transmission coil of the wireless power transmitting device when the apparatus including the wireless power receiving device 10-5 receives power supplied by the wireless power transmitting device.

As illustrated in FIG. 9, an average value of pattern widths in a region A1 of the reception coil 11-5 is larger than that of pattern widths in a region A2 of the reception coil 11-5. For this reason, the reception coil 11-5 has an asymmetrical shape, and a position of the center C1 of the inner boundary line of the reception coil 11-5 and a position of the center C2 of the outer boundary line of the reception coil 11-5 are different from each other. In an embodiment, the center C1 refers to a center of gravity of a figure formed by the inner boundary line of the reception coil 11-5, and the center C2 refers to a center of gravity of a figure formed by the outer boundary line of the reception coil 11-5.

In the wireless power receiving device, according to an embodiment, a distance D between the center C1 of the inner boundary line of the reception coil 11-5 and the center C2 of the outer boundary line of the reception coil 11-5 is equal to about 7% or more of a distance R between the center C1 of the inner boundary line of the reception coil 11-5 and the inner boundary line of the reception coil 11-5 in a direction of a virtual line connecting the center C1 of the inner boundary line of the reception coil 11-5 and the center C2 of the outer boundary line of the reception coil 11-5 to each other. The distance D is set to be equal to 7% or more of the distance R, whereby an actual effect is obtained even though a process tolerance, occurs.

In addition, the distance D is about 15% or less of the distance R. The distance D is set as described above, whereby charging performance is satisfied and performance of other coils is not substantially degraded.

In addition, according to an embodiment, the average value of the widths of the patterns in the region A1 of the reception coil 11-5 is about 1.1 times or more the average value of the widths of the patterns in the region A2 of the reception coil 11-5.

In addition, according to an embodiment, the average value of the widths of the patterns in the region A1 of the reception coil 11-5 is about 1.25 times or less the average value of the widths of the patterns in the region A2 of the reception coil 11-5. The average values of the widths of the patterns are set as described above, whereby an actual effect is obtained even through a process tolerance occurs, and it is able to be confirmed as a result of repeated experimentation that the numerical values as described above are a substantially optimal ratio without having a deteriorating influence on the performance of other coils.

As described above, the average value of the widths of the patterns in the region A1 of the reception coil 11-5 are larger than that of the widths of the patterns in the region A2 of the reception coil 11-5. The region A1 is a region corresponding to a position at which a distance between the center C1 of the inner boundary line of the reception coil 11-5 and an inner boundary line of the first communications coil 12-5 is relatively long, and the region A2 is a region corresponding to a position at which a distance between the center C1 of the inner boundary line of the reception coil 11-5 and the inner boundary line of the first communications coil 12-5 is relatively short.

Figure 10:
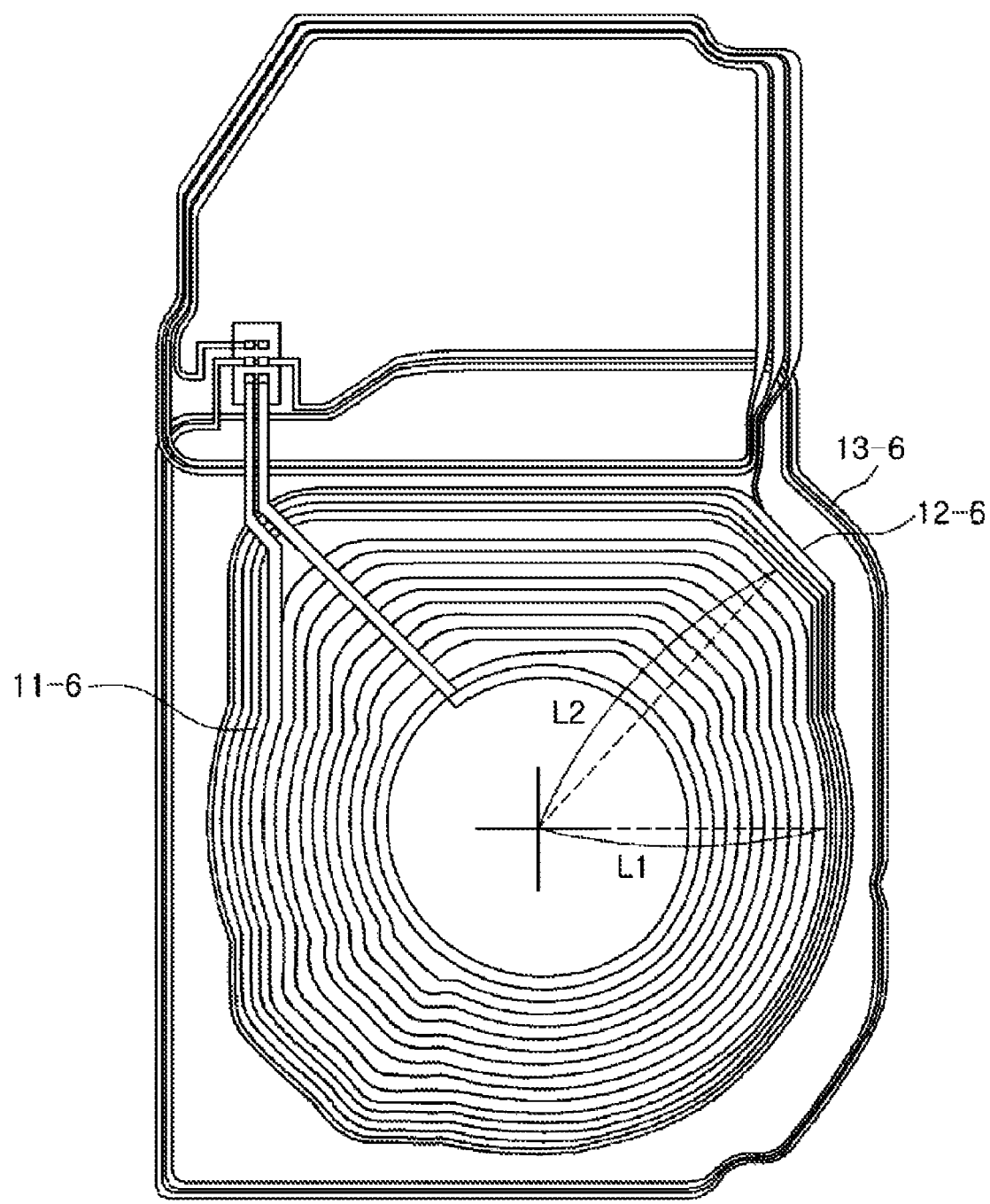

FIG. 10 is a schematic plan view illustrating a wireless power receiving device, according to an embodiment. FIG. 10 schematically illustrates coils of the wireless power receiving device. The wireless power receiving device 10-6, according to an embodiment, includes a reception coil 11-6, a first communications coil 12-6, and a second communications coil 13-6.

The first communications coil 12-6 and the second communications coil 13-6 are disposed at an outer region of the wireless power receiving device 10-6. The reception coil 11-6 is disposed inwardly of an inner boundary line of the outer region in which the first communications coil 12-6 and the second communications coil 13-6 are disposed.

As described above with reference to FIG. 9, in one or more embodiments, a portion of the first communications coil 12-6 or the second communications coil 13-6 may also be disposed inwardly of an inner boundary line of a region in which the reception coil 11-6 is formed.

The reception coil 11-6 receives wirelessly transmitted power.

The first communications coil 12-6 and the second communications coil 13-6 transmit and/or receive data in different schemes. For example, the first communications coil 12-6 is an MST coil transmitting information (for example, credit card information) using a magnetic field, and the second communications coil 13-6 is an NFC coil for near field communications.

As illustrated in FIG. 10, a figure formed by an inner boundary line of the reception coil 11-6 and a figure formed by an outer boundary line of the reception coil 11-6 have different shapes. In addition, an average value of pattern widths of the reception coil 11-6 in a direction (an L2 direction) corresponding to a position at which a distance between a center C of the inner boundary line of the reception coil 11-6 and an inner boundary line of the first communications coil 12-6 is relatively long is larger than that of pattern widths of the reception coil 11-6 in a direction (an L1 direction) corresponding to a position at which a distance between the center C of the inner boundary line of the reception coil 11-6 and the inner boundary line of the first communications coil 12-6 is relatively short.

Figure 11:
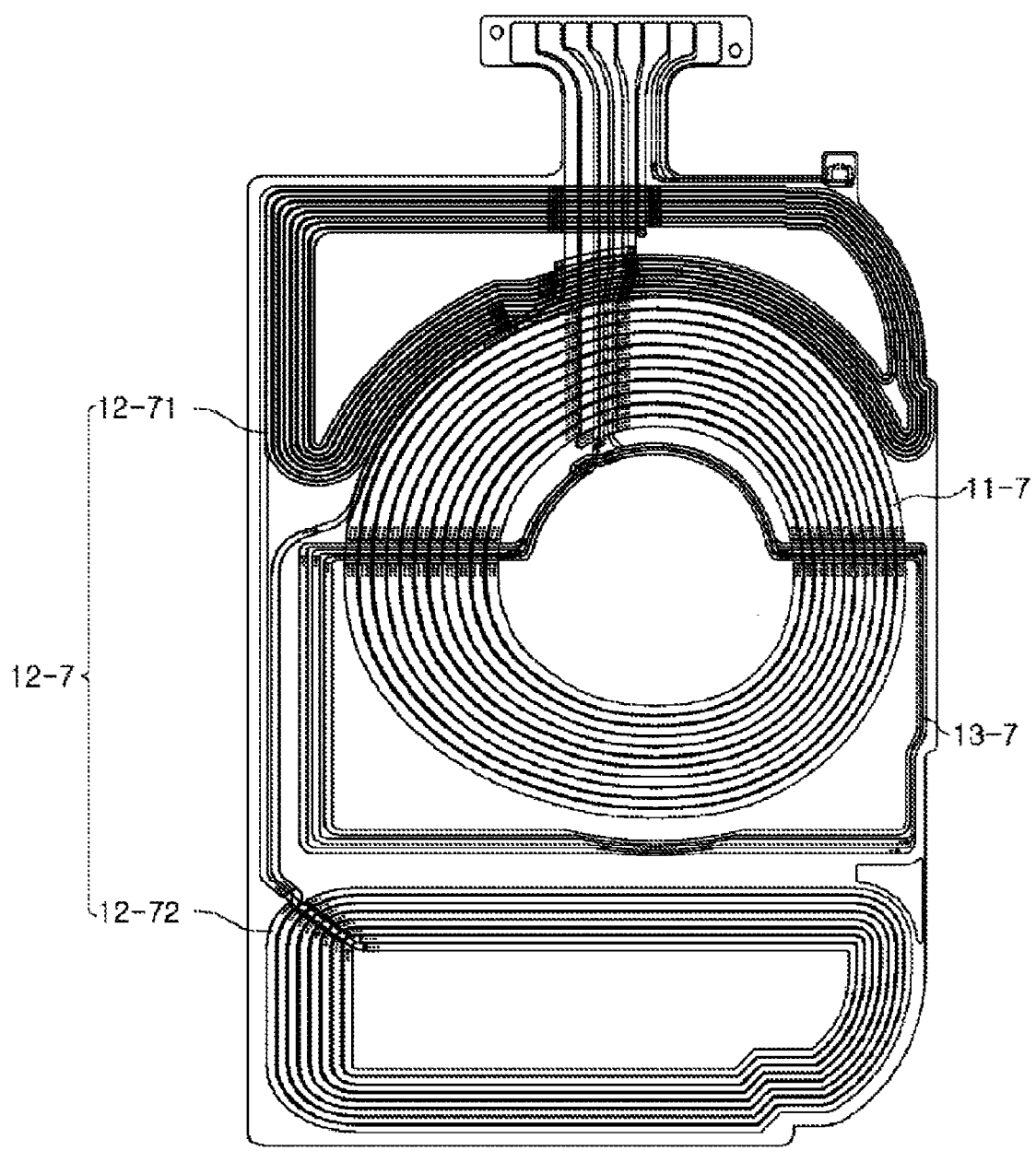

FIG. 11 is a schematic plan view illustrating a wireless power receiving device, according to an embodiment. FIG. 11 schematically illustrates only coils of the wireless power receiving device. The wireless power receiving device 10-7, according to an embodiment, includes a reception coil 11-7, a first communications coil 12-7, and a second communications coil 13-7.

The first communications coil 12-7 is disposed in an outer region of the wireless power receiving device 10-7. The reception coil 11-7 is disposed inwardly of an inner boundary line of the outer region in which the first communications coil 12-7 is disposed. A portion of the second communications coil 13-7 is disposed in the outer region of the wireless power receiving device 10-7, and the other portion of the second communications coil 13-7 is disposed inwardly of an inner boundary line of a region in which the reception coil 11-7 is disposed.

According to an embodiment, the first communications coil 12-7 is formed by connecting two coil portions 12-71 and 12-72 to each other.

The reception coil 11-7 receives wirelessly transmitted power.

The first communications coil 12-7 and the second communications coil 13-7 transmit and/or receive data in different schemes. For example, the first communications coil 12-7 is an MST coil transmitting information (for example, credit card information) using a magnetic field, and the second communications coil 13-7 is an NFC coil for near field communications.

As illustrated in FIG. 11, pattern widths of the reception coil 11-7 are different from each other depending on regions. In more detail, average values of pattern widths in left and upper regions of the reception coil 11-7 of FIG. 11 are larger than those of pattern widths in right and lower regions of the reception coil 11-7 of FIG. 11.

Figure 12:
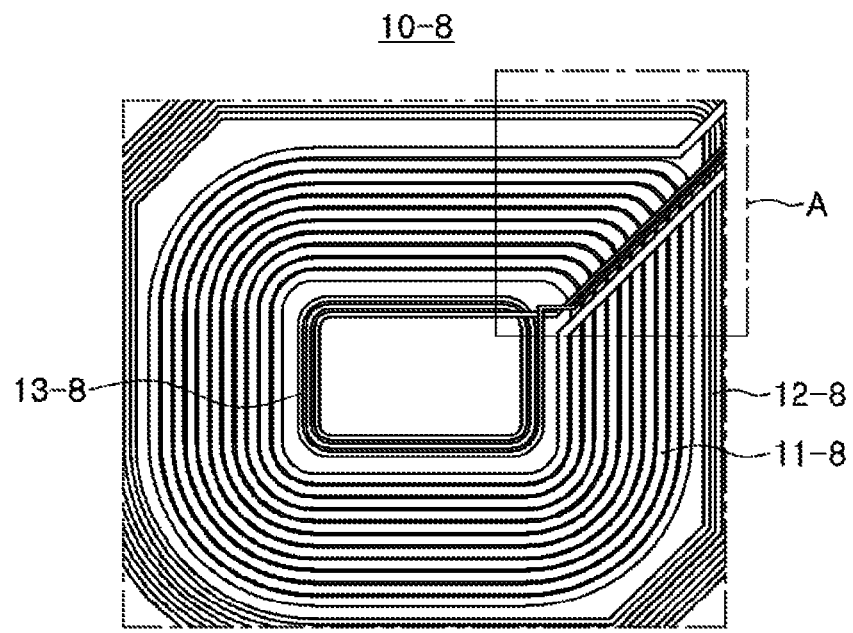

FIG. 12, a schematic plan view illustrating a wireless power receiving device, according to an embodiment, is a schematic plan view illustrating only coils of the wireless power receiving device. The wireless power receiving device 10-8, according to an embodiment, includes a reception coil 11-8. The wireless power receiving device 10-8, according to an embodiment, further includes a first communications coil 12-8 and/or a second communications coil 13-8.

According to an embodiment, the reception coil 11-8 is formed of n layers (here, n indicates a natural number of 2 or more) except a region in which a lead-in wire (a pattern led externally from an internal terminal of the reception coil 11-8 in a region A) is disposed, and the reception coil is formed of m layers (here, m indicates a natural number smaller than n) in the region in which the lead-in wire is disposed.

In addition, according to an embodiment, an average value of pattern widths in the region in which the lead-in wire of the reception coil 11-8 is disposed is larger than that of pattern widths in a region except the region in which the lead-in wire is disposed.

That is, according to an embodiment, the reception coil 11-8 is implemented to have a plurality of layers. However, the number of layers of the reception coil 11-8 is smaller in the region in which the lead-in wire for connecting the internal terminal of the reception coil 11-8 to the outside of the reception coil 11-8 is disposed than in a region in which the lead-in wire is not disposed. According to an embodiment illustrated in FIG. 12, pattern widths of coil patterns in the region in which the lead-in wire is disposed are established to be wider than those of coil patterns in the region in which the lead-in wire is not disposed. Therefore, resistance loss is reduced to reduce heat generation.

As described above, the wireless power receiving device 10-8, according to an embodiment, further includes the first communications coil 12-8 disposed outside of the reception coil 11-8 and/or the second communications coil 13-8 disposed inside the reception coil 11-8. The first communications coil 12-8 is an NFC antenna, a coil for near field communications, or may be an MST antenna, a coil for mobile payment information. The second communications coil 13-8 is an NFC antennal, a coil for near field communications. Although not illustrated, the second communications coil 13-8 may be connected to a coil disposed outside of the reception coil 11-8.

Figure 13:
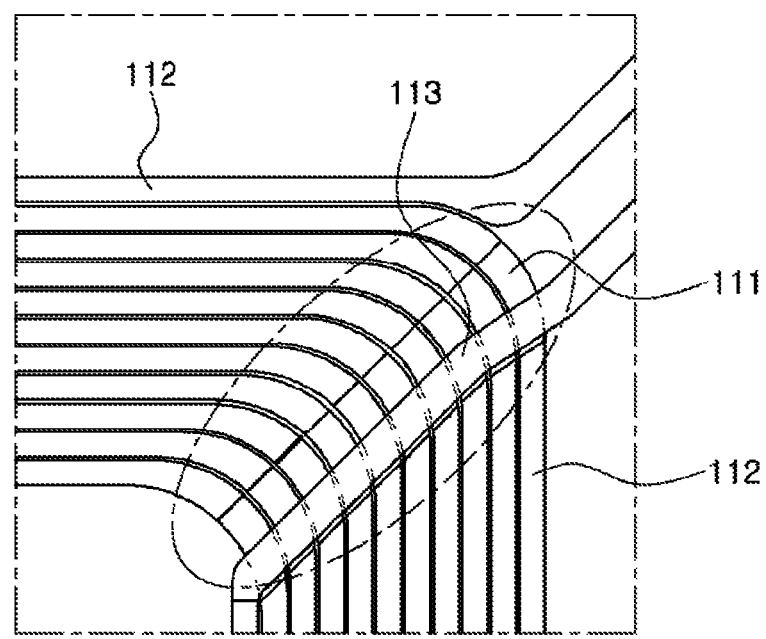
FIG. 13 is a view illustrating a lead-in part of a reception coil of the wireless power receiving device, according to an embodiment illustrated in FIG. 12, in more detail.

FIG. 13 is a view illustrating a lead-in part A of a reception coil of the wireless power receiving device, according to an embodiment illustrated in FIG. 12, in more detail. FIG. 13 illustrates only the reception coil 11-8 (see FIG. 12).

As illustrated in FIG. 13, in the wireless power receiving device, according to an embodiment, an average value of conductive pattern widths 111 in a region in which a lead-in wire 113 is disposed is larger than that of pattern widths 112 in a region in which the lead-in wire is not disposed.

Figure 14:
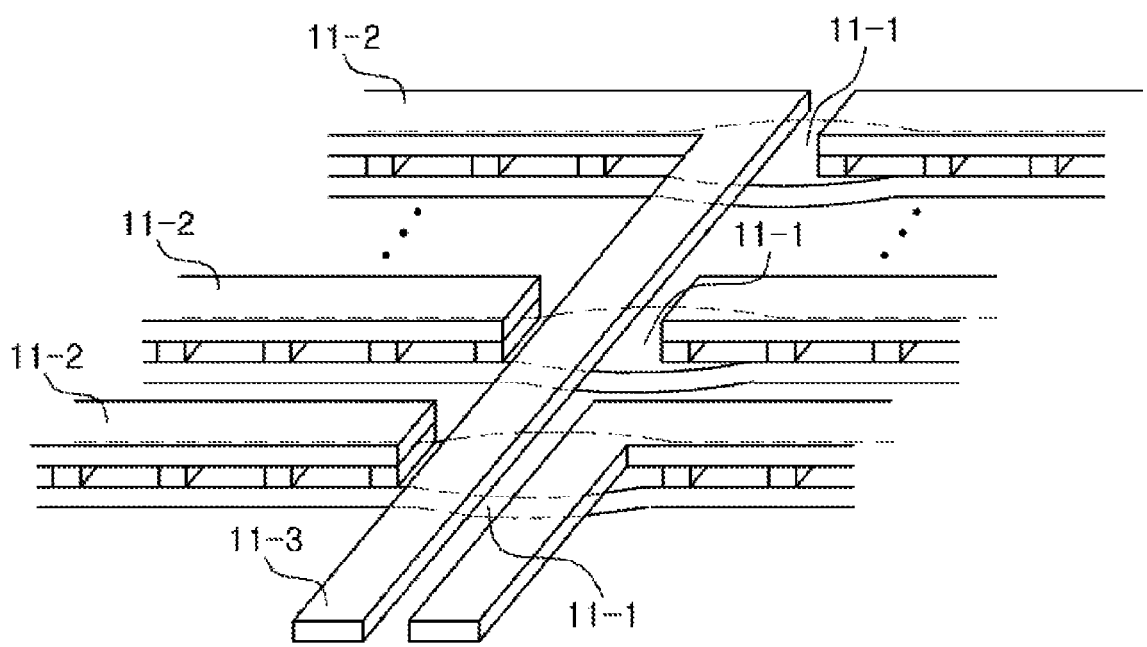
FIG. 14 is a schematic perspective view illustrating the lead-in part of the reception coil of the wireless power receiving device, according to an embodiment illustrated in FIG. 12.

FIG. 14 is a schematic perspective view illustrating a lead-in part of a reception coil of the wireless power receiving device, according to an embodiment, illustrated in FIGS. 12 and 13, illustrates only the reception coil 11-8 (see FIG. 12).

As illustrated in FIG. 14, in the wireless power receiving device, according to an embodiment, coil patterns 112 in the region in which the lead-in wire 113 is not disposed are formed of two layers. Therefore, performance of the wireless power receiving device is improved, heat generated in the wireless power receiving device is reduced, and the wireless power receiving device is able to be substantially miniaturized.

In addition, as illustrated in FIG. 14, in the wireless power receiving device, according to an embodiment, the coil patterns 111 in the region in which the lead-in wire 113 is disposed are formed of one layer, and have pattern widths wider than those of the coil patterns 112 in the region in which the lead-in wire 113 is not disposed. Therefore, heat generated in the wireless power receiving device is reduced.

An example in which the coil patterns in the region in which the lead-in wire is disposed in the reception coil are formed of one layer and the coil patterns in the region in which the lead-in wire is not disposed in the reception coil are formed of two layers has been illustrated in FIG. 14, but the number of layers of the coil patterns may be variously modified.

As a non-exhaustive example only, a terminal/device/unit as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), or any other device known to one of ordinary skill in the art as being suitable for inclusion in a computing system or computer. The memory controller and the flash memory device may constitute a solid-state drive or disk (SSD) that uses non-volatile memory to store data.

As set forth above, in the wireless power receiving device and the apparatus including the same, according to one or more embodiments, heat generation performance and heat radiation performance are improved, such that charging efficiency is improved, a lifespan of the wireless power receiving device is increased, and performance of a connected circuit is improved, amongst other benefits.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power receiving device, comprising:
a first coil partially disposed in an outer region and configured to transmit and/or receive data; and
a second coil disposed inwardly of an inner boundary line of the outer region and configured to receive wirelessly transmitted power,
wherein a center defined by an inner boundary line of the second coil and a center defined by an outer boundary line of the second coil are different from each other.

2. The wireless power receiving device of claim 1, wherein a distance between the center defined by the inner boundary line and the center defined by the outer boundary line of the second coil is equal to about 7% or more of a distance between the defined by the inner boundary line and the inner boundary line of the second coil in a direction of a virtual line connecting the center of the inner boundary line of the second coil and the center of the outer boundary line of the second coil to each other.

3. The wireless power receiving device of claim 2, wherein the distance between the center defined by the inner boundary line and the center defined by the outer boundary line of the second coil is about 15% or less of the distance between the center defined by the inner boundary line and the inner boundary line of the second coil in the direction of the virtual line connecting the center defined by the inner boundary line and the center defined by the outer boundary line of the second coil to each other.

4. The wireless power receiving device of claim 1, wherein the second coil comprises a first region and a second region, the second region is separate from the first region, and
an average value of pattern widths in the first region is larger than that of pattern widths in the second region.

5. The wireless power receiving device of claim 4, wherein a distance between the center defined by the inner boundary line of the second coil and an inner boundary line of the first coil in the first region is larger than a distance between the center defined by the inner boundary line of the second coil and the inner boundary line of the first coil in the second region.

6. The wireless power receiving device of claim 4, wherein the average value of the widths of the patterns in the first region is about 1.1 times or more the average value of the widths of the patterns in the second region.

7. The wireless power receiving device of claim 6, wherein the average value of the widths of the patterns in the first region is equal to about 1.25 times or less the average value of the widths of the patterns in the second region.

8. The wireless power receiving device of claim 4, wherein the first region comprises a region in which a lead-in wire connecting an internal terminal of the second coil to a terminal disposed outside of the second coil is disposed.

9. The wireless power receiving device of claim 8, wherein the second coil is formed of n layers, where n is a natural number, in the first region, and is formed of m layers, where m is a natural number which is larger than n, in the second region.

10. The wireless power receiving device of claim 1, wherein a shape formed by the inner boundary line of the second coil and a shape formed by the outer boundary line of the second coil are different from each other.

11. An apparatus, comprising:
a processor configured to input or output data;
a battery configured to supply power to the processor; and
a wireless power receiving device configured to receive wirelessly transmitted power and selectively supply charging power to the battery and the processor, wherein the wireless power receiving device comprises
a first coil partially disposed in an outer region and configured to transmit and/or receive the data; and
a second coil disposed inwardly of an inner boundary line of the outer region and configured to receive the wirelessly transmitted power,
a center defined by an inner boundary line and a center defined by an outer boundary line of the second coil being different from each other.

12. The apparatus of claim 11, wherein a distance between the center of the inner boundary line of the second coil and the center of the outer boundary line of the second coil is equal to about 7% or more of a distance between the center of the inner boundary line of the second coil and the inner boundary line of the second coil in a direction of a virtual line connecting the center of the inner boundary line of the second coil and the center of the outer boundary line of the second coil to each other.

13. The apparatus of claim 11, wherein the second coil comprises a first region and a second region, the second region being separate from the first region, and
an average value of pattern widths in the first region is larger than that of pattern widths in the second region.

14. The apparatus of claim 13, wherein the average value of the widths of the patterns in the first region is about 1.1 times or more the average value of the widths of the patterns in the second region.

15. The apparatus of claim 13, wherein the first region comprises a region in which a lead-in wire connecting an internal terminal of the second coil to a terminal disposed outside of the second coil is disposed.

16. The apparatus of claim 15, wherein the second coil is formed of n layers, where n is a natural number, in the first region, and is formed of m layers, where m is a natural number which is larger than n, in the second region.

17. A wireless device, comprising:
a coil loop conductor having a first width at a first portion, and a second width at a second portion, wherein the first width is different from the second width, an outer periphery of the coil loop conductor defining a center, and an inner periphery of the coil loop conductor defining a cavity portion, the cavity portion being displaced about the center;
and,
a lead out conductor portion extending from the cavity portion to an outer portion.

18. The wireless device of claim 17, wherein a center, defined relative to an inner periphery of the coil loop conductor, is displaced from the center defined relative to an outer periphery of the coil loop conductor.

19. A wireless device, comprising:
a loop conductor extending in a spiral manner from an external terminal to an internal cavity portion defined by an inner periphery of the loop conductor, and an outer periphery of the loop conductor defining a center, the cavity portion being displaced about the center, and the loop conductor having different widths as it traverses the spiral circumferentially; and,
a lead out conductor connecting a distal end of the loop conductor to the external terminal, wherein an average width of a lead out portion of the loop conductor where the lead out conductor is placed is larger than an average width of the other portion of the loop conductor.

20. The wireless device of claim 19, wherein the loop conductor comprises a plurality of layers m, interconnected with vias, and a plurality of layers n, where n is less than m, proximate to the lead out portion.

* * * * *